Patented Sept. 22, 1925.

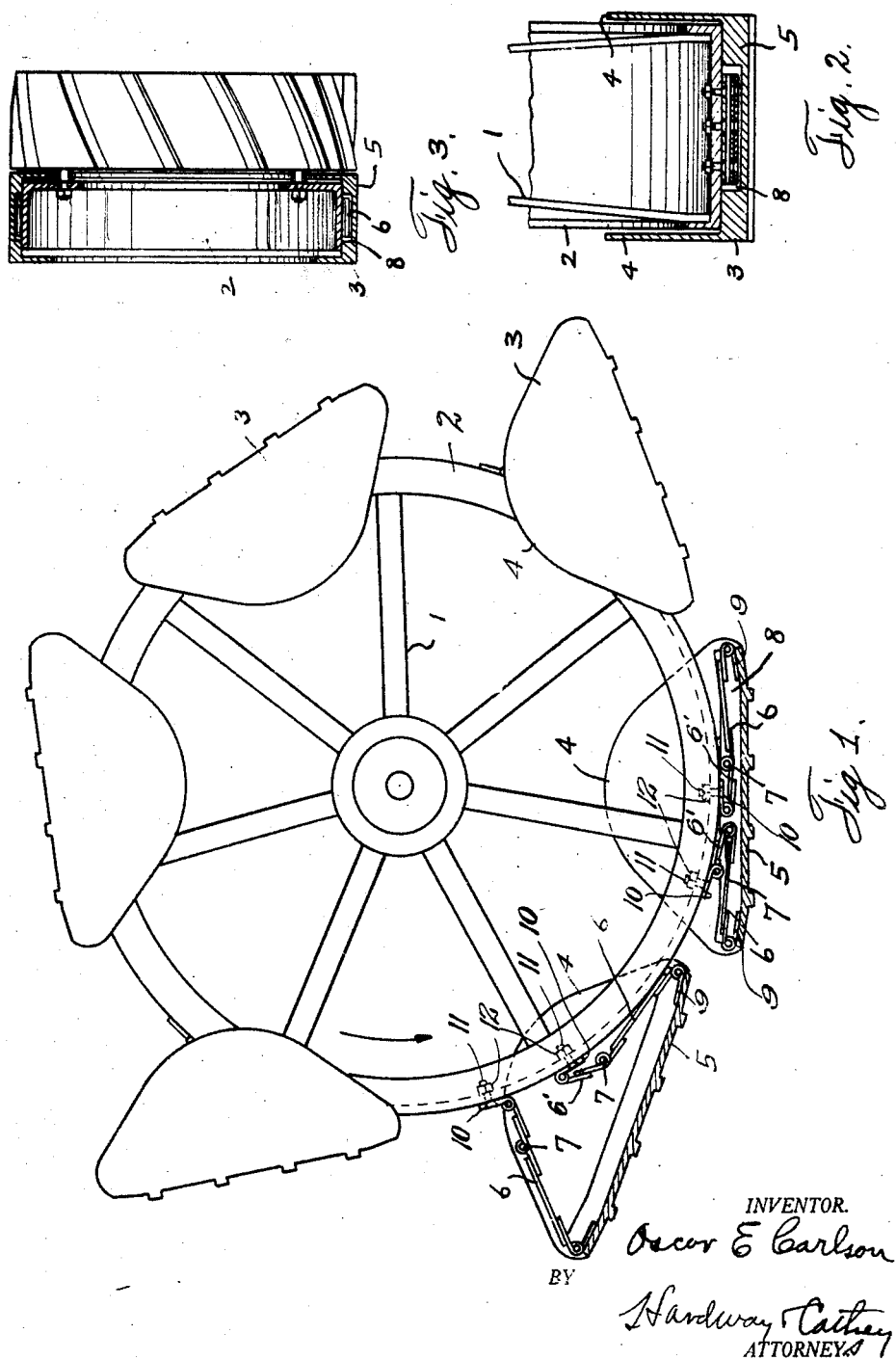

1,554,333

UNITED STATES PATENT OFFICE.

OSCAR E. CARLSON, OF HOUSTON, TEXAS.

TRACTOR WHEEL.

Application filed September 29, 1924. Serial No. 740,535.

*To all whom it may concern:*

Be it known that I, OSCAR E. CARLSON, a citizen of the United States, residing at Houston, in the county of Harris and State of Texas, have invented certain new and useful Improvements in a Tractor Wheel, of which the following is a specification.

This invention relates to new and useful improvements in a tractor wheel.

One object of the invention is to provide a tractor wheel, of the character described, equipped with a plurality of comparatively wide traction shoes, pivoted to the periphery of the wheel and spaced apart, said shoes successively coming in contact with the ground, as the wheel advances, thus forming a substantially continuous track over which the wheel moves, and preventing the slipping or spinning of the wheel in moving over soft or sandy road.

With the above and other objects in view this invention has particular relation to certain novel features of construction, operation and arrangements of parts an example of which is given in this specification and illustrated in the accompanying drawings, wherein:—

Figure 1 shows a side view of the device partly in section.

Figure 2 shows an enlarged cross sectional view thereof, and

Figure 3 shows a cross sectional view of the wheel, shown bolted to the side of a conventional type of tractor wheel.

Referring now more particularly to the drawings the numeral 1 designates a tractor wheel having the rim 2. This wheel may be used alone, or in combination with a conventional type of tractor wheel, as shown in Figure 3.

A plurality of shoes, 3, are connected to the wheel rim 2, as hereinafter described, and spaced apart therearound.

These shoes are substantially U-shaped in cross section, having the spaced wings, 4, 4 which embrace the wheel rim on opposite sides, and which upstand from the wide base 5. Each shoe is fastened to the wheel rim by means of the links 6, 6 and 6', 6'. These links 6, 6, are pivoted, at their outer ends, to the respective ends of the shoe, and the links 6', 6' are pivoted at their inner ends to the rim 2, and the corresponding links 6, 6' are connected by a hinge joint 7, these intermediate joints permitting the shoes to swing by gravity, into horizontal position, successively, as the wheel moves forwardly, and to come in contact with the ground in front of the wheel, in succession, thus forming a continuous track for the wheel as it advances, and as the wheel passes off of a shoe the rear link 6 will straighten out, as shown in Figure 1, permitting said shoe to lie in horizontal position, on the ground until the wheel has passed on to the next shoe.

The links 6, 6 are pivoted to the shoe as stated through the end brackets 9, 9 which are permanently fastened to the shoe, and to which said links 6 are hinged. The inner ends of the links 6', 6' are connected to the brackets 10, 10 which are removably secured to the wheel rim by means of bolts 11 which are held in place by the nuts 12.

The inner surface of the base 5 has a long groove 8 in which the links lie when the wheel 1 rests on the shoe as shown in Figures 1 and 2, so that said links, and the joints thereof, will not sustain any of the weight of the wheel and be injured.

What I claim is:—

A traction shoe having a relatively flat base, two pairs of links, the links of each pair being hinged together, one link of each pair being adapted to be hinged to a wheel rim and the other links of the respective pairs being hinged to opposite ends of the shoe.

In testimony whereof I have signed my name to this specification.

OSCAR E. CARLSON.